(12) United States Patent
Turcotte et al.

(10) Patent No.: US 10,041,741 B2
(45) Date of Patent: Aug. 7, 2018

(54) HEAT EXCHANGER FOR GAS TURBINE ENGINES

(71) Applicant: PRATT & WHITNEY CANADA CORP., Longueuil (CA)

(72) Inventors: Herve Turcotte, Sainte-Julie (CA); Kevin Ng, Hamilton (CA); Jean Dubreuil, Boucherville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 167 days.

(21) Appl. No.: 14/922,247

(22) Filed: Oct. 26, 2015

(65) Prior Publication Data

US 2017/0114722 A1  Apr. 27, 2017

(51) Int. Cl.
| | |
|---|---|
| F28D 7/16 | (2006.01) |
| F02C 7/224 | (2006.01) |
| B01D 35/00 | (2006.01) |
| B01D 35/18 | (2006.01) |
| F02C 7/22 | (2006.01) |

(52) U.S. Cl.
CPC ......... *F28D 7/1669* (2013.01); *B01D 35/005* (2013.01); *B01D 35/18* (2013.01); *F02C 7/224* (2013.01); *F02C 7/222* (2013.01); *F05D 2220/323* (2013.01); *F05D 2240/35* (2013.01); *F05D 2260/213* (2013.01)

(58) Field of Classification Search
CPC ..... F02C 7/224; B01D 35/005; F28D 9/0025; F28D 7/1676; F28F 2210/06; F28F 2235/00
See application file for complete search history.

(56) References Cited

U.S. PATENT DOCUMENTS

| | | | | |
|---|---|---|---|---|
| 3,920,383 | A | * | 11/1975 | Kerr ........................ F23C 3/002 126/91 A |
| 4,096,616 | A | | 6/1978 | Coffinberry |
| 4,096,910 | A | | 6/1978 | Coffinberry et al. |
| 4,878,536 | A | * | 11/1989 | Stenlund ................ B01D 35/18 123/196 AB |
| 5,326,461 | A | * | 7/1994 | Legrand ................ B01D 35/18 165/119 |
| 5,406,910 | A | | 4/1995 | Wallin |
| 5,476,139 | A | * | 12/1995 | Gire ...................... B01D 29/114 165/119 |
| 6,206,090 | B1 | * | 3/2001 | Rago ...................... B01D 29/15 165/119 |
| 6,263,960 | B1 | * | 7/2001 | Yamanaka ............. F01M 11/03 123/196 AB |
| 7,108,139 | B2 | * | 9/2006 | Nguyen ................ B01D 27/06 210/437 |
| 2004/0177949 | A1 | * | 9/2004 | Shimoya ................ F28F 1/022 165/152 |

(Continued)

*Primary Examiner* — Devon Russell
(74) *Attorney, Agent, or Firm* — Norton Rose Fulbright Canada LLP (57) ABSTRACT

A heat exchanger defines an annulus divided by a plurality of radial plates extending longitudinal along the annulus, into a plurality of channels. A first group of the channels form an oil passage and a second group of channels form a fuel passage. The channels in the respective first and second groups are circumferentially alternately positioned one to another, and heat transfer from the oil passage to the fuel passage takes place through the radial plates.

20 Claims, 5 Drawing Sheets

(56) References Cited

U.S. PATENT DOCUMENTS

| | | | |
|---|---|---|---|
| 2004/0178765 A1* | 9/2004 | O'Brien | B01J 8/0285 320/101 |
| 2008/0072425 A1* | 3/2008 | Whittenberger | B21D 53/02 29/890.03 |
| 2009/0056926 A1* | 3/2009 | Chen | F28F 3/046 165/167 |
| 2012/0292002 A1* | 11/2012 | Saumweber | F02B 29/0462 165/164 |
| 2014/0060504 A1* | 3/2014 | Collins | F02M 25/0737 123/568.12 |
| 2015/0336034 A1* | 11/2015 | Carrion | B01D 29/56 210/774 |
| 2017/0021292 A1* | 1/2017 | Turcotte | F02C 7/22 |
| 2017/0114722 A1 | 4/2017 | Turcotte et al. | |

\* cited by examiner

HEAT EXCHANGER FOR GAS TURBINE ENGINES

TECHNICAL FIELD

The application relates generally to gas turbine engines and, more particularly, to heat exchangers for such engines such as a fuel-oil heat exchanger.

BACKGROUND OF THE ART

In gas turbine engines a fuel supply system is provided to pump liquid fuel from a fuel tank into a combustor of the gas turbine engine. To remove foreign particles and other impurities, a fuel filter is positioned at an accessible point in the fuel supply system. Conventionally, the relatively cold incoming fuel from the fuel tank is used to cool the relatively hot oil scavenged from bearing, gearboxes, etc. and circulated in an oil system of the gas turbine engine. The fuel is in turn heated by the oil, thereby reducing the risk of icing in the fuel supply system. Therefore, a fuel-oil heat exchanger is conventionally used for the thermal energy exchange between the fuel supply system and the oil circulation system. The fuel-oil heat exchanger may also be positioned at a location in the fuel supply system and the oil circulation system which is convenient for access and inspection. Therefore, a combined fuel-oil heat exchanger and fuel filter arrangement may be used in a gas turbine engine to filter fuel while transferring thermal energy between the oil circulation system and the fuel supply system.

Accordingly, an improved fuel-oil heat exchanger is desirable for use in such a combined heat exchanger and fuel filter arrangements.

SUMMARY

In one aspect, there is provided a heat exchanger comprising: a plurality of interlaced first and second longitudinally-extending channels within an annulus, the plurality of first and second channels being distributed about a longitudinal axis of the heat exchanger, the plurality of first and second channels being circumferentially alternately positioned and separated from one another by a plurality of radially-extending plates, the plates having an undulating shape, the plurality of first channels fluidly interconnected to provide a first fluid passage configurable for connection to first fluid source, and the plurality of second channels fluidly interconnected to provide a second fluid passage configurable for connection to a second fluid source.

In another aspect, there is provided a fuel-oil heat exchanger comprising: a first cylindrical wall and a second cylindrical wall co-axially positioned about a longitudinal axis defining an annulus radially therebetween, the second cylindrical wall defining a central cavity therein; and a plurality of radially-extending plates to divide the annulus into a plurality of longitudinally-extending channels positioned around the longitudinal axis and circumferentially adjacent one to another, each of the channels having a transverse cross section defining a fluid passing area extending radially inwardly from an annular inner surface of the first cylindrical wall and terminating at an annular outer surface of the second cylindrical wall, a first group of the channels forming a passage for directing a flow passing therethrough and a second group of the channels forming a passage for directing the flow passing therethrough, and the channels in the respective first and second groups being circumferentially alternately positioned one to another.

In a further aspect, there is provided a heat exchanger and fuel filter arrangement having a fuel-oil heat exchanger and a fuel filter, the heat exchanger comprising: an annular housing defining a longitudinal axis, the annular housing having a manifold attached to an open end thereof, the manifold having oil inlet and outlet ports and fuel inlet and outlet ports defined therein; a first cylindrical wall and a second cylindrical wall co-axially positioned within the annular housing about the longitudinal axis, the annular housing and the first cylindrical wall defining an annular cavity radially therebetween, the first and second cylindrical walls defining an annulus radially therebetween, the second cylindrical wall defining a central cavity therein for receiving said fuel filter; a plurality of radial plates extending longitudinally to divide the annulus into an array of longitudinally-extending channels circumferentially adjacent one to another around the longitudinal axis, each of the channels having a transverse cross section defining a fluid passing area extending radially inwardly from an annular inner surface of the first cylindrical wall and terminating at an annular outer surface of the second cylindrical wall, the channels in respective first and second groups being circumferentially alternately positioned one to another, the first group of channels forming an oil passage for directing a hot oil flow passing therethrough and the second group of channels forming a fuel passage for directing a cold fuel flow passing therethrough prior to passing through the fuel filter, the oil inlet port being in fluid communication with an inlet end of the oil passage via the annular cavity and the oil outlet port being in fluid communication with an outlet end of the oil passage, the fuel inlet port being in fluid communication with an inlet end of the fuel passage, and the fuel outlet port being in fluid communication with an outlet end of the fuel passage via the fuel filter.

DESCRIPTION OF THE DRAWINGS

Reference is now made to the accompanying figures in which.

It will be noted that throughout the appended drawings that like features are identified by like reference numerals.

DETAILED DESCRIPTION

Figure 1:
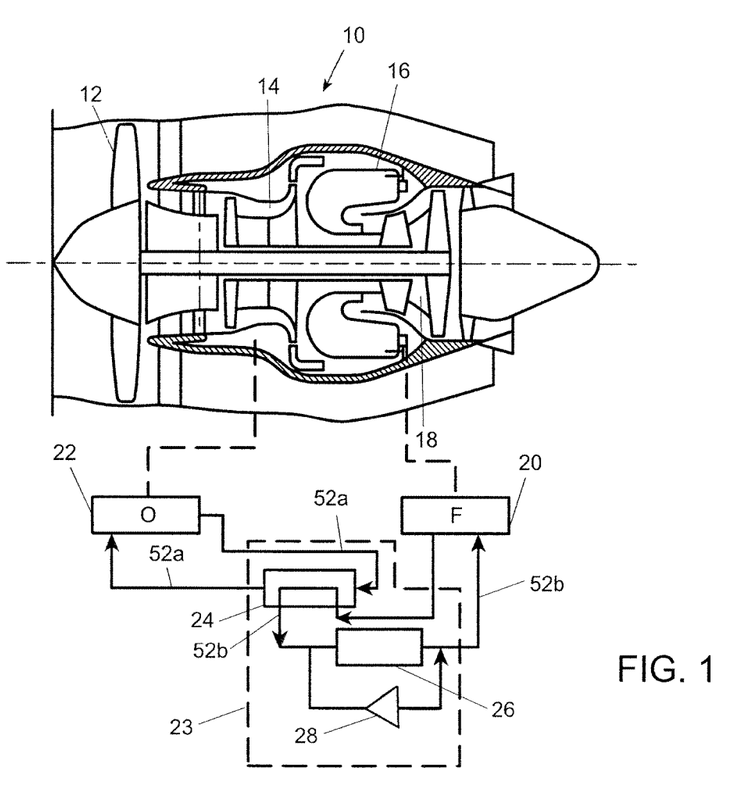
FIG. 1 is a schematic side cross-sectional view of a gas turbine engine as an example illustrating application of the described subject matter and includes a diagram illustrating an example of a fuel-oil heat exchanger and fuel filter arrangement to transfer thermal energy between the oil circulation system and the fuel supply system of the engine.

FIG. 1 illustrates a turbofan gas turbine engine 10, which is taken as an examplary application of the described subject matter. The gas turbine engine 10 generally comprises in serial flow communication a fan 12 through which ambient air is propelled, a compressor section 14 for pressurizing the air, a combustor 16 in which the compressed air is mixed with fuel and ignited for generating an annular stream of combustion gases, and a turbine section 18 for extracting energy from the combustion gases. The gas turbine engine 10 includes a fuel supply system 20 which may generally include a fuel tank, fuel pumps, a fuel control unit, etc. for providing a fuel supply to the combustor 16 for burning and generating the combustion gases for the engine. The gas turbine engine 10 also includes an oil circulation system 22 which may generally include an oil tank, oil pumps, etc. for providing and circulating lubrication for the engine. A fuel-oil heat exchanger (FOHE) 24 and a fuel filter 26 may be provided in an FOHE and fuel filter arrangement 23 to transfer thermal energy between the oil circulation system 22 and the fuel supply system 20. Optionally, a bypass valve 28 may be included in the arrangement.

Figure 2:
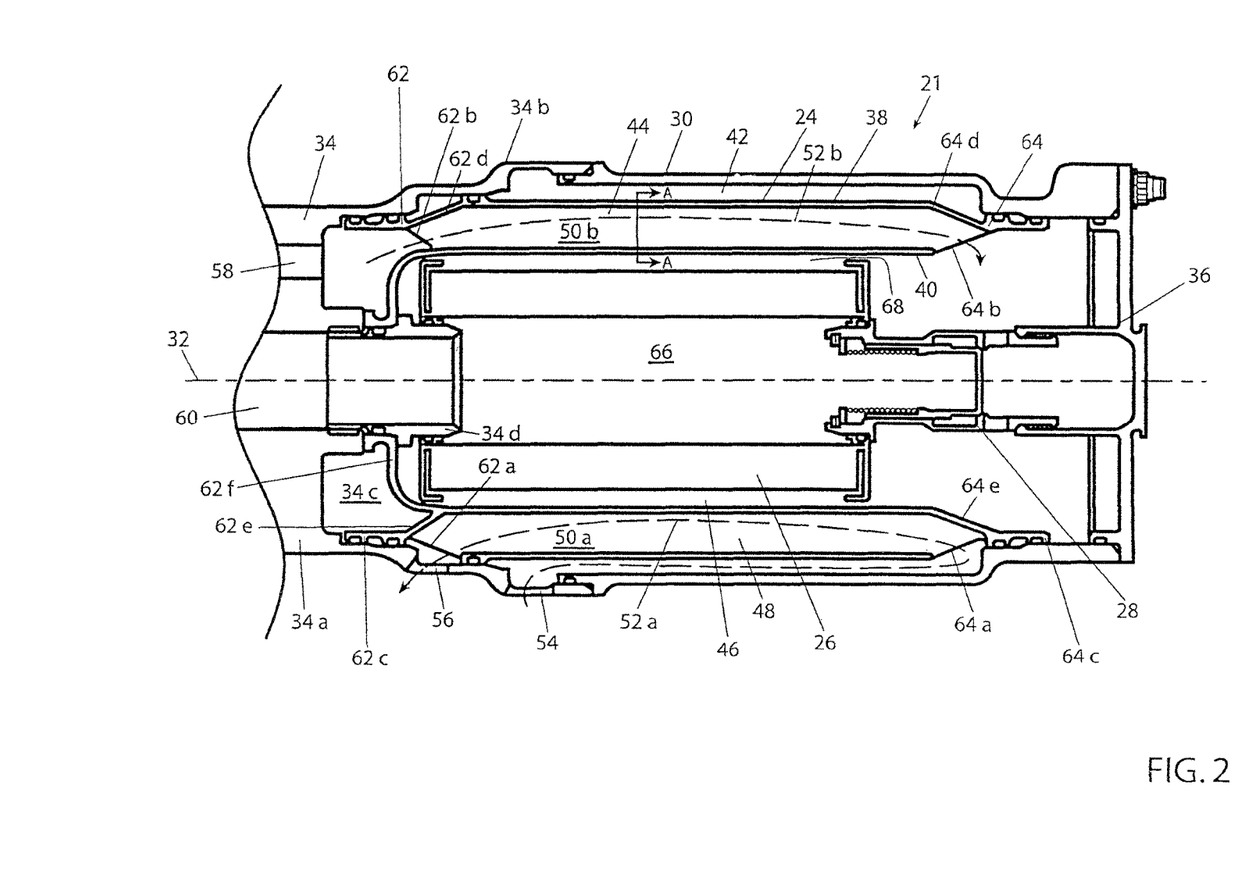
FIG. 2 is a side cross-sectional view of an apparatus showing the fuel-oil heat exchanger and fuel filter arrangement of FIG. 1, according to one embodiment.

Referring to FIGS. 1 and 2, according to one embodiment, the heat exchanger and fuel filter arrangement 23 may be configured in an apparatus 21 including the FOHE 24 and the fuel filter 26, optionally with the bypass valve 28. The FOHE 24 may be installed in a concentric arrangement with the fuel filter 26, and optionally the bypass valve 28. The FOHE 24 may generally include a housing 30 having an annular wall, and defines a central longitudinal axis 32. The housing 30 may have a manifold 34 attached to a first open end of the annular wall of the housing 30 and a maintenance cap 36 attached to a second open end of the annular wall of the housing 30.

It should be noted that the terms "radial", "axial", "longitudinal" and "transverse" used throughout the description and the appended claims of this application are defined with respect to the longitudinal axis 32 of the FOHE 24.

Referring to FIGS. 2-6, the FOHE 24 may include a first cylindrical wall 38 and a second cylindrical wall 40 co-axially positioned within the annular wall of the housing 30 about the longitudinal axis 32. The annular wall of the housing 30 and the first cylindrical wall 38 in combination may define an annular cavity 42 radially therebetween. The first and second cylindrical walls 38 and 40 in combination may define an annulus 44 radially therebetween. The second cylindrical wall 40 may define a central cavity 46 therein. The fuel filter 26 which may be configured in a cylindrical profile, is received in the central cavity 46.

A plurality of plates 48 which may be radially oriented and may interconnect the first and second cylindrical walls 38, 40, may extend longitudinally along the annulus 44 to divide the annulus 44 into an array of longitudinally-extending channels 50a, 50b, circumferentially adjacent one to another around the longitudinal axis 32. Each of the channels 50a, 50b may have a transverse cross-section defining a fluid passing area extending radially inwardly from an annular inner surface of the first cylindrical wall 38 and terminating at an annular outer surface of the second cylindrical wall 40. The respective fluid passing areas of the channels 50a and 50b may be substantially identical one to another or different one from another in shape and size. The channels 50a (which may be referred to as a first group of channels) and the channels 50b (which may be referred to as a second group of channels) may be circumferentially alternately positioned one to another such that each of the first group of channels 50a is positioned immediately adjacent and between two of the second group of channels 50b and similarly, each of the second group of channels 50b is positioned immediately adjacent and between two of the first group of channels 50a.

Figure 3:
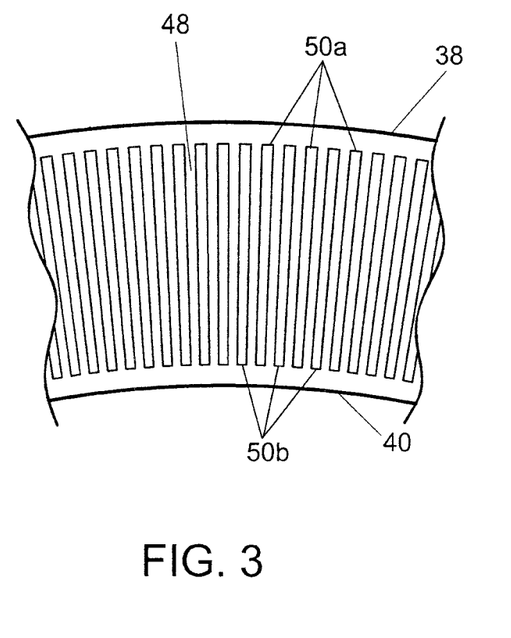
FIG. 3 is a partial transverse cross-sectional view of the apparatus of FIG. 2, taken along line A-A, showing a fuel passage and an oil passage formed by alternately positioned channels, according to one embodiment.

The first group of channels 50a may form an oil passage for directing a hot oil flow 52a passing therethrough, and the second group of channels 50b may form a fuel passage for directing a cold fuel flow 52b passing therethrough. The manifold 34 may define an oil inlet port 54 in fluid communication with an inlet end of the oil passage via the annular cavity 42, and an oil outlet port 56 in fluid communication with an outlet end of the oil passage. The manifold 34 may further define a fuel inlet port 58 in fluid communication with an inlet end of the fuel passage and a fuel outlet port 60 in fluid communication with an outlet end of the fuel passage via the fuel filter 26. The radial plates 48 which define the first and second group of channels 50a, 50b and thus the respective oil passage and fuel passage, effectively transfer thermal energy from the relatively hot oil flow 52a to the relatively cold fuel flow 52b and the heated fuel flow 52b must then pass through the fuel filter 26 in order to be delivered through the fuel supply system 20 to the combustor 16 (see FIG. 1).

Figure 4:
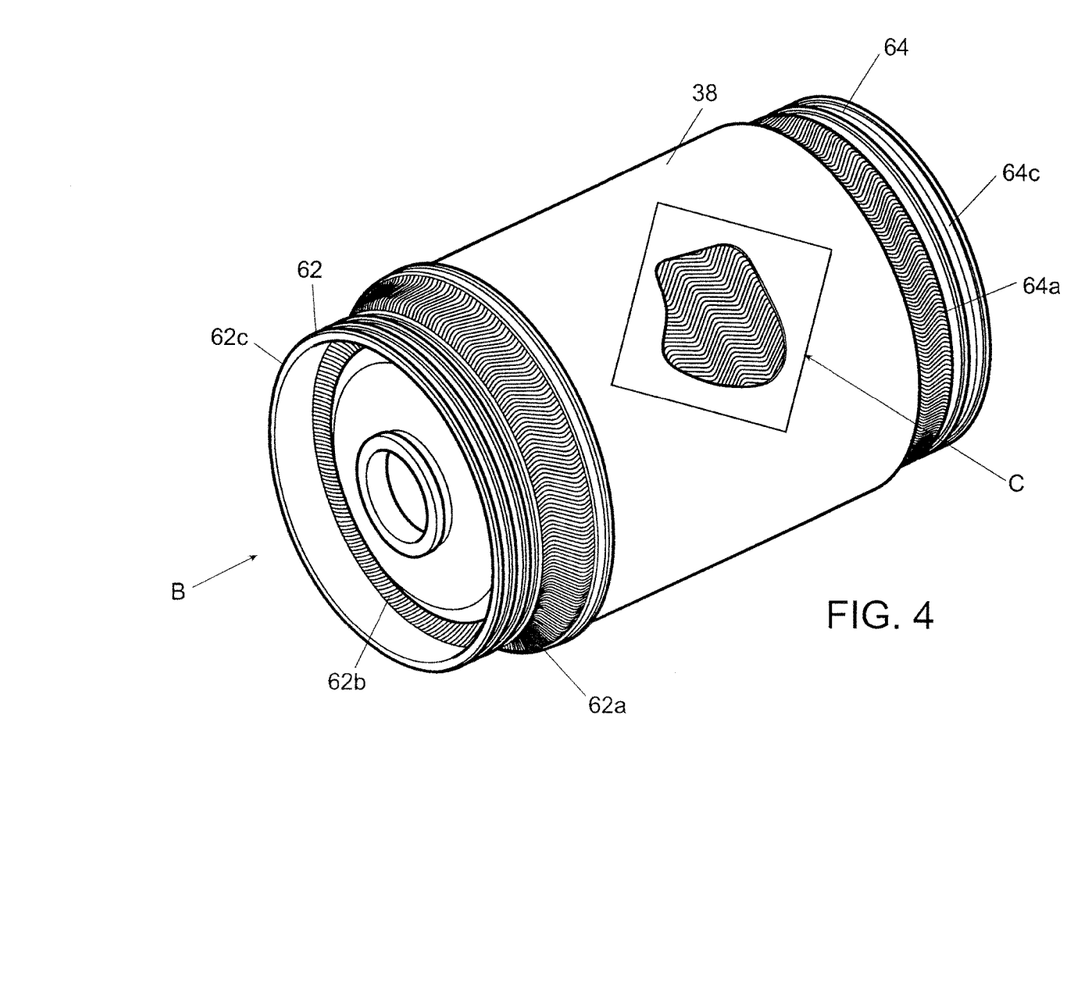
FIG. 4 is a perspective view of a core portion of a fuel-oil heat exchanger included in the apparatus of FIG. 1, with a heat exchanger housing and a fuel filter removed.
Figure 6:
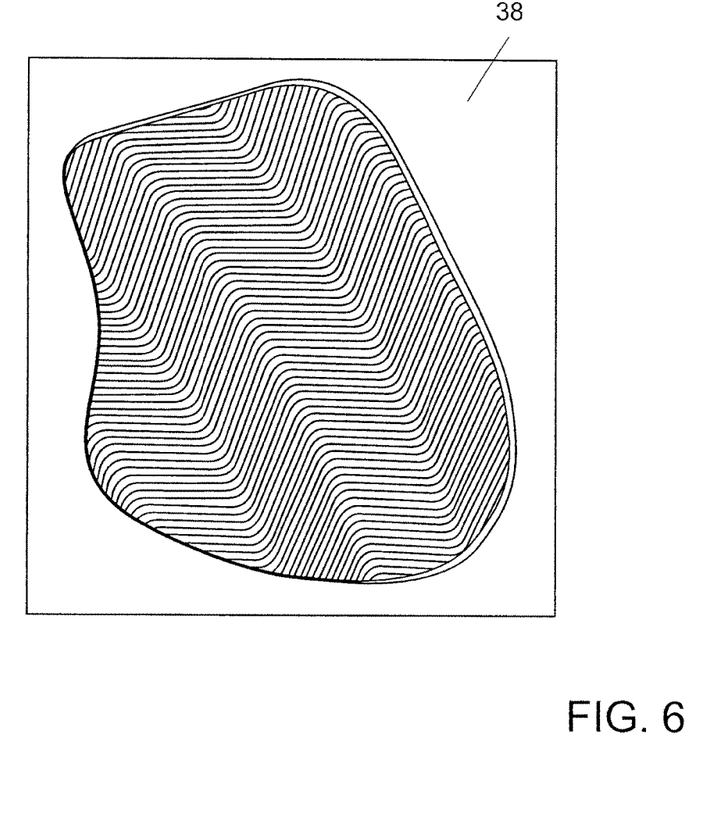
FIG. 6 is a partial perspective view of the core portion of the fuel-oil heat exchanger of FIG. 4, illustrating an enlarged portion indicated by arrow C showing a wavy or undulating configuration of the respective oil and fuel passages, according to another embodiment.

The plates 48 may be completely straight or according to another embodiment as shown in FIGS. 4 and 6, may be configured in a wavy or undulating profile. The plates 48 may have a wavy or undulating profile extending in an axial direction (the plates 48 are straight in respective radial directions), or may have a wavy or undulating profile extending in respective radial directions (the plates 48 are straight in an axial direction). Therefore, the respective oil passages and fuel passages defined by the respective first and second group of channels 50a, 50b are also configured in a corresponding wavy or undulating configuration. Such oil and fuel passages which are wavy or undulating radially and/or axially, may improve heat exchanger performance.

The FOHE 24 may include a first annular end wall structure 62 connected to a first end of the respective first and second cylindrical walls 38, 40 and joining the respective plates 48. The FOHE 24 may further include a second annular end wall structure 64 connected to a second end of the respective first and second cylindrical walls 38, 40 and also joining the respective plates 48.

Figure 5:
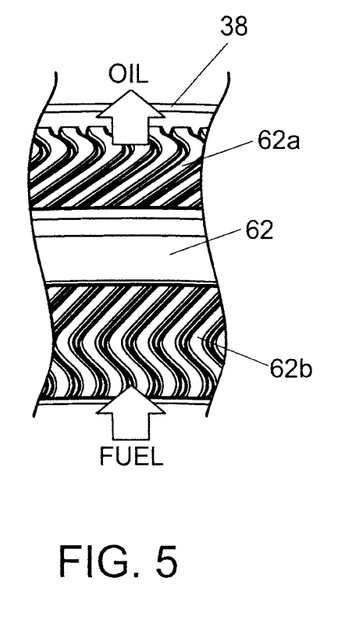
FIG. 5 is a partial front elevational view of the core portion of the fuel-oil heat exchanger of FIG. 4, viewed in a direction indicated by arrow B, showing the oil passage outlet and fuel passage inlet.

The first annular end wall structure 62 may define a first array of circumferentially spaced slots 62a and a second array of circumferentially spaced slots 62b extending therethrough. The first array of slots 62a may be positioned in a first annular area around a second annular area in which the second array of slots 62b are positioned, as shown in FIG. 5. The first array of slots 62a may be in fluid communication with the first group of channels 50a to form an oil passage outlet or the oil passage outlet end which is in fluid communication with the oil outlet port 56. The second array of slots 62b may be in fluid communication with the second group of channels 50b to form a fuel passage inlet or the fuel passage inlet end which is in fluid communication with the fuel inlet port 58.

Similar to the first annular end wall structure 62, the second annular end wall structure 64 may include a third array of circumferentially spaced slots 64a and a fourth array of circumferentially spaced slots 64b extending therethrough. The third array of slots 64a may be positioned in a third annular area around a fourth annular area in which the fourth array of slots 64b are positioned, similar to the first and second annular areas of the respective first and second array of slots 62a, 62b shown in FIG. 5. The third array of slots 64a may be in fluid communication with the first group of channels 50a to form an oil passage inlet or the oil passage inlet end which is in fluid communication with the oil inlet port 54 and the fourth array of slots 64b may be in fluid communication with the second group of channels 50b to form a fuel passage outlet or the fuel passage outlet end which is in fluid communication with the fuel outlet port 60.

The slots 62a, 62b, 64a and 64b may have a substantially rectangular shape or may be in a wavy or undulating or curved configuration depending on the shape of the respective first and second group of channels 50a, 50b and the orientation of the respective slots (radially, axially or inclined with respect to the central axis 32 as shown in FIG. 2).

The manifold 34 according to one embodiment may include a cylindrical body 34a defining an annular end cavity 34c around a central connector 34d. A skirt portion 34b may extend longitudinally from the cylindrical body 34a and may be connected to the annular wall of the housing 30. The oil inlet and outlet ports 54, 56 may be located in the skirt portion 34b and the fuel inlet and outlet ports 58, 60 may be located in the cylindrical body 34a. The fuel inlet port 58 may be in fluid communication with the second group of channels 50b (the fuel passage) via the annular end cavity 34c and the fuel outlet port 60 may be located in the center of the cylindrical body 34a and may be in fluid communication with a fuel filter outlet central passage 66 of the fuel filter 26 via a central hole in the central connector 34d.

The first annular end wall structure 62 according to one embodiment may include a cylindrical ring 62c supported within the housing 30, for example in the cylindrical body 34a of the manifold 34, and a pair of annular walls 62d and 62e may extend divergently from the cylindrical ring 62c and may be connected to the respective first and second cylindrical walls 38, 40. The radially outwardly divergent annular wall 62d provides the first annular area to position the first array of slots 62a which extend through the radially outwardly divergent annular wall 62d. The radially inwardly divergent annular wall 62e provides the second annular area to position the second array of slots 62b which extend through the radially inwardly divergent annular wall 62e. An annular central support structure 62f may be provided to the first annular end wall structure 62, joining the second cylindrical wall 40 and extending radially inwardly toward and thereby supporting the central connector 34d of the manifold 34.

The second annular end wall structure 64 may include a cylindrical ring 64c supported within the housing 30, for example on the annular wall of the housing 30 and a pair of annular walls 64d, 64e may extend divergently from the cylindrical ring 64c and may be connected to the respective first and second cylindrical walls 38, 40. The radially outwardly divergent annular wall 64d provides the third annular area to position the third array of slots 64a which extend through the radially outwardly divergent annular wall 64d. The radially inwardly divergent annular wall 64e provides the fourth annular area to position the fourth array of slots 64b which extend through the radially inwardly divergent annular wall 64e.

The optional bypass valve 28 may be installed within the housing 30, and may be supported between the maintenance cap 36 and one end of the fuel filter 26 which is in turn received within the central cavity 46 defined by the second cylindrical wall 40 and may be supported at the other end of the fuel filter by the central connector 34d of the manifold 34. The maintenance cap 36 may be removed from the annular wall of the housing 30 to provide access to all the components contained within the housing 30 for maintenance service.

The first and second annular end wall structures 62, 64 are properly sealingly attached to the housing 30 such that the hot oil flow 52a passing through the apparatus 21 is isolated from the fuel flow 52b passing through the apparatus 21.

Referring to FIGS. 1 and 2, the relatively hot oil flow 52a is introduced from the oil circulation system 22, passes through the oil inlet port 54, the annular cavity 42, the third array of slots 64a, the first group of channels 50a (the oil passage), the first array of slots 62a and the oil outlet port 56, and is then delivered back to the oil circulation system 22. The relatively cold fuel flow 52b is introduced from the fuel supply system 20, passes through the fuel inlet port 58, the annular end cavity 34c, the second array of slots 62b, the second group of channels 50b (the fuel passage), the fourth array of slots 64b, enters an annular gap 68 between the second cylindrical wall 40 and the fuel filter 26 and passes through a filtering unit of the fuel filter 26 radially inwardly into the fuel filter outlet central passage 66, and is then discharged through the central connector 34d and the fuel outlet port 60 back to the fuel supply system 20. The heat exchange takes place between the relatively hot oil flow 52a and the relatively cold fuel flow 52b while passing through the respective first and second group of channels 50a and 50b. In a situation in which the fuel filter 26 becomes partially or completely blocked by ice crystals or other foreign particles, the bypass valve 28 is forced open to allow the heated fuel flow discharged from the fourth array of slots 64b to bypass the filtering unit of the fuel filter 26 and directly enter into the fuel filter outlet central passage 66. Bypass valves 28 are optional and are known in the art and therefore will not be further described in detail.

In certain Reynolds numbers flow conditions, the FOHE 24 according to the described embodiments can be more efficient than conventional heat exchangers in which fins may be employed for heat exchange. The described embodiments also provide a concentric FOHE concept in a compact and light-weight configuration with improved thermal energy transfer performance. The described embodiments may reduce variability in thermal energy transfer performance resulting from the fin tolerances of the conventional heat exchangers.

The above description is meant to be exemplary only, and one skilled in the art will recognize that changes may be made to the embodiments described without departing from the scope of the described subject matter. For example, the schematically illustrated turbofan gas turbine engine is an examplary application of the described subject matter and the described subject matter may be applicable in gas turbine engines of other types. Modifications which fall within the scope of the described subject matter will be apparent to those skilled in the art, in light of a review of this disclosure, and such modifications are intended to fall within the appended claims.

The invention claimed is:

1. A heat exchanger comprising: a plurality of interlaced first and second longitudinally-extending channels within an annulus defined radially between a first cylindrical wall and a second cylindrical wall, the plurality of first and second channels being distributed about a longitudinal axis of the heat exchanger, the plurality of first and second channels being circumferentially alternately positioned and separated from one another by a plurality of radially-extending plates connected to the first cylindrical wall and to the second cylindrical wall, the plates having an undulating shape, the plurality of first channels fluidly interconnected to provide a first fluid passage configurable for connection to first fluid source, and the plurality of second channels fluidly interconnected to provide a second fluid passage configurable for connection to a second fluid source, a first end wall structure including first and second annular walls each connected to a first end of a respective one of the first and second cylindrical walls, the first end wall structure defining a first array of slots extending through the first annular wall and in fluid communication with the plurality of first channels, and a second array of slots extending through the second annular wall and in fluid communication with the plurality of second channels.

2. The heat exchanger as defined in claim 1, wherein a housing defines said longitudinal axis as a central axis thereof, the first and second cylindrical walls being located within the housing and being co-axially positioned about the longitudinal axis, and the second cylindrical wall defining a central cavity therein.

3. The heat exchanger as defined in claim 1, wherein the plates are radially straight.

4. The heat exchanger as defined in claim 1, wherein the plates are axially straight.

5. The heat exchanger as defined in claim 2, wherein the housing comprises a manifold attached to an axial end of the housing, the manifold having a first fluid inlet port, a first fluid outlet port, a second fluid inlet port and a second fluid outlet port located therein, the first fluid inlet port and the first fluid outlet port being in fluid communication with the first fluid passage, and the second fluid inlet port and the second fluid outlet port being in fluid communication with the second fluid passage.

6. The heat exchanger as defined in claim 5, wherein the first fluid and second fluid passages define a first fluid passage inlet and outlet and a second fluid passage inlet and outlet respectively, the first fluid passage outlet and second fluid passage inlet being located in the first annular end wall structure, the first fluid passage inlet and second fluid passage outlet being located in a second annular end wall structure connected to a second end of the first and second cylindrical walls, the first fluid passage inlet and outlet and the second fluid passage inlet and outlet being in fluid communication with the respective first fluid inlet and outlet ports, and second fluid inlet and outlet ports.

7. The heat exchanger as defined in claim 6, wherein a third array of circumferentially spaced slots and a fourth array of circumferentially spaced slots extend through the second annular end wall structure, the first array of slots and the third array of slots being in fluid communication with the first channels to form said respective first fluid passage outlet and inlet, the second array of slots and the fourth array of slots being in fluid communication with the second channels to form said respective second fluid passage inlet and outlet, the first array of slots being positioned around the second array of slots, and the third array of slots being positioned around the fourth array of slots.

8. The heat exchanger as defined in claim 6, wherein the housing and the first cylindrical wall define an annular cavity radially therebetween, the annular cavity being in fluid communication with the first fluid inlet port in the housing and the first fluid passage inlet in the second annular end wall structure.

9. A fuel-oil heat exchanger comprising: a first cylindrical wall and a second cylindrical wall co-axially positioned about a longitudinal axis defining an annulus radially therebetween, the second cylindrical wall defining a central cavity therein; and a plurality of radially-extending plates connected to the first cylindrical wall and to the second cylindrical wall to divide the annulus into a plurality of longitudinally-extending channels positioned around the longitudinal axis and circumferentially adjacent one to another, each of the channels having a transverse cross section defining a fluid passing area extending radially inwardly from an annular inner surface of the first cylindrical wall and terminating at an annular outer surface of the second cylindrical wall, a first group of the channels forming a passage for directing a flow passing therethrough and a second group of the channels forming a passage for directing the flow passing therethrough, and the channels in the respective first and second groups being circumferentially alternately positioned one to another a first end wall structure including first and second annular walls each connected to a first end of a respective one of the first and second cylindrical walls, the first end wall structure defining a first array of slots extending through the first annular wall and in fluid communication with the plurality of first channels, and a second array of slots extending through the second annular wall and in fluid communication with the plurality of second channels.

10. The fuel-oil heat exchanger as defined in claim 9, wherein the respective fluid passing areas are substantially identical in shape and size.

11. The fuel-oil heat exchanger as defined in claim 9, further comprising: a second annular end wall structure connected to a second end of the first and second cylindrical walls, third and fourth arrays of circumferentially spaced slots extending through the second annular end wall structure, the slots in the first array and the slots in the third array being in fluid communication with the first group of channels to form a respective oil passage outlet and inlet, the slots in the second array and the slots in the fourth array being in fluid communication with the second group of channels to form a respective fuel passage inlet and outlet.

12. The fuel-oil heat exchanger as defined in claim 11, wherein the first array of slots is positioned around the second array of slots and wherein the third array of slots is positioned around the fourth array of slots.

13. The fuel-oil heat exchanger as defined in claim 11, further comprising: a housing defining said longitudinal axis as a central axis thereof and containing the first and second cylindrical walls therein, the housing including an oil inlet port and an oil outlet port in fluid communication with the respective oil passage inlet and oil passage outlet, the housing including a fuel inlet port and a fuel outlet port in fluid communication with the respective fuel passage inlet and the fuel passage outlet.

14. The fuel-oil heat exchanger as defined in claim 13, wherein the housing and the first cylindrical wall define an annular cavity radially therebetween in fluid communication with the oil inlet port in the housing and the oil passage inlet in the second annular end wall structure.

15. The fuel-oil heat exchanger as defined in claim 13, wherein an axial end of the housing defines a manifold, the oil inlet port, oil outlet port, fuel inlet port and fuel outlet port being located in the manifold.

16. The fuel-oil heat exchanger as defined in claim 9, wherein the channels of the first and second groups are configured in an undulating profile.

17. A heat exchanger and fuel filter arrangement having a fuel-oil heat exchanger and a fuel filter, the heat exchanger comprising: an annular housing defining a longitudinal axis, the annular housing having a manifold attached to an open end thereof, the manifold having oil inlet and outlet ports and fuel inlet and outlet ports defined therein; a first cylindrical wall and a second cylindrical wall co-axially positioned within the annular housing about the longitudinal axis, the annular housing and the first cylindrical wall defining an annular cavity radially therebetween, the first and second cylindrical walls defining an annulus radially therebetween, the second cylindrical wall defining a central cavity therein for receiving said fuel filter; a plurality of radial plates extending longitudinally to divide the annulus into an array of longitudinally-extending channels circumferentially adjacent one to another around the longitudinal axis, the plurality of radial plates connected to the first cylindrical wall and to the second cylindrical wall, each of the channels having a transverse cross section defining a fluid passing area extending radially inwardly from an annular inner surface of the first cylindrical wall and terminating at an annular outer surface of the second cylindrical wall, the channels in respective first and second groups being circumferentially alternately positioned one to another, the first group of channels forming an oil passage for directing a hot oil flow passing therethrough and the second group of channels forming a fuel passage for directing a cold fuel flow passing therethrough prior to passing through the fuel filter, the oil inlet port being in fluid communication with an inlet end of the oil passage via the annular cavity and the oil outlet port being in fluid communication with an outlet end of the oil passage, the fuel inlet port being in fluid communication with an inlet end of the fuel passage, and the fuel outlet port being in fluid communication with an outlet end of the fuel passage via the fuel filter a first end wall structure including first and second annular walls each connected to a first end of a respective one of the first and second cylindrical walls, the first end wall structure defining a first array of slots extending through the first annular wall and in fluid communication with the plurality of first channels, and a second array of slots extending through the second annular wall and in fluid communication with the plurality of second channels.

18. The heat exchanger and fuel filter arrangement as defined in claim 17, wherein each of the radial plates is configured in an undulating profile.

19. The heat exchanger and fuel filter arrangement as defined in claim 17, wherein the manifold comprises a cylindrical body defining an annular end cavity around a central connector, and a skirt portion extending from the cylindrical body and connected to the annular housing, the oil inlet and outlet ports being located in the skirt portion and the fuel inlet and outlet ports being located in the cylindrical body, the fuel inlet port being in fluid communication with the inlet end of the fuel passage via the annular end cavity and the fuel outlet port being in fluid communication with the fuel filter via the central connector.

20. The heat exchanger and fuel filter arrangement as defined in claim 17, wherein the fuel-oil heat exchanger further comprises a second end wall structure connected to a second end of the first and second cylindrical walls, each of the first and second end wall structures including a cylindrical ring supported within the housing, the second end wall structure including a pair of annular walls extending divergently from the cylindrical ring and being connected to the respective first and second cylindrical walls and joining the radial plates, each of the annular walls of the second end wall structure defining an array of circumferentially spaced slots extending therethrough, the slots in one of the annular walls which is facing radially outwardly, being in fluid communication with the first group of channels to form one of said respective inlet and outlet ends of the oil passage, the slots in one of the annular walls which is facing radially inwardly, being in fluid communication with the second group of channels to form one of said respective inlet and outlet ends of the fuel passage.

\* \* \* \* \*